United States Patent
Andrews et al.

(10) Patent No.: US 11,354,380 B1
(45) Date of Patent: Jun. 7, 2022

(54) SYSTEMS AND METHODS FOR EVALUATING PAGE CONTENT

(71) Applicant: Facebook, Inc., Menlo Park, CA (US)

(72) Inventors: Clayton Allen Andrews, Menlo Park, CA (US); Ankur Gupta, Sunnyvale, CA (US); Aliasgar Mumtaz Husain, San Jose, CA (US); Rakesh Ravuru, Santa Clara, CA (US); Shubham Bansal, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 150 days.

(21) Appl. No.: 16/290,815

(22) Filed: Mar. 1, 2019

(51) Int. Cl.
*G06F 17/00* (2019.01)
*G06F 16/958* (2019.01)
*G06N 20/00* (2019.01)
*G06F 16/9536* (2019.01)
*G06Q 10/06* (2012.01)
*G06F 16/9538* (2019.01)
*G06Q 50/00* (2012.01)

(52) U.S. Cl.
CPC ........ *G06F 16/972* (2019.01); *G06F 16/9536* (2019.01); *G06F 16/9538* (2019.01); *G06N 20/00* (2019.01); *G06Q 10/06315* (2013.01); *G06Q 50/01* (2013.01)

(58) Field of Classification Search
CPC .............. G06F 16/972; G06F 16/9536; G06F 16/9538; G06N 20/00; G06Q 10/06315; G06Q 50/01
See application file for complete search history.

(56) References Cited

U.S. PATENT DOCUMENTS

| | | | |
|---|---|---|---|
| 7,062,510 B1 * | 6/2006 | Eldering | G06Q 30/02 |
| 10,776,626 B1 * | 9/2020 | Lin | G06K 9/6253 |
| 2008/0098000 A1 * | 4/2008 | Koretz | G06Q 30/06 |
| 2008/0249987 A1 * | 10/2008 | Ogasawara | G06F 16/9535 |
| 2008/0294618 A1 * | 11/2008 | Hamilton, II | G06F 16/9577 |
| 2010/0145762 A1 * | 6/2010 | Coladonato | G06Q 30/0241 |
| | | | 705/14.4 |
| 2010/0162359 A1 * | 6/2010 | Casey | H04L 67/22 |
| | | | 726/3 |
| 2010/0211863 A1 * | 8/2010 | Jones | G06F 40/174 |
| | | | 715/224 |
| 2016/0232575 A1 * | 8/2016 | Kirti | G06Q 30/0275 |
| 2019/0361875 A1 * | 11/2019 | Rogynskyy | G06F 11/3495 |

* cited by examiner

*Primary Examiner* — Mohammed H Zuberi
(74) *Attorney, Agent, or Firm* — Sheppard Mullin Richter & Hampton LLP

(57) ABSTRACT

Systems, methods, and non-transitory computer-readable media can determine a set of candidate values for a field in a page. The set of candidate values can be evaluated for accuracy based at least in part on a machine learning model, wherein the machine learning model outputs a respective score for each candidate value that measures an accuracy of the candidate value for the field in the page. A best scoring candidate value can be determined from the set of candidate values. The field in the page can be associated with the best scoring candidate value.

17 Claims, 8 Drawing Sheets

SYSTEMS AND METHODS FOR EVALUATING PAGE CONTENT

FIELD OF THE INVENTION

The present technology relates to the field of networked communications. More particularly, the present technology relates to techniques for improving the accuracy of content presented to users in a computerized networking system.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others.

SUMMARY

Various embodiments of the present technology can include systems, methods, and non-transitory computer readable media configured to determine a set of candidate values for a field in a page. The set of candidate values can be evaluated for accuracy based at least in part on a machine learning model, wherein the machine learning model outputs a respective score for each candidate value that measures an accuracy of the candidate value for the field in the page. A best scoring candidate value can be determined from the set of candidate values. The field in the page can be associated with the best scoring candidate value.

In an embodiment, the field corresponds to at least one of: a page category field, a website field, a phone number field, an hours of operation field, and a physical address field.

In an embodiment, the systems, methods, and non-transitory computer readable media are further configured to cause the field in the page to be populated with the best scoring candidate value.

In an embodiment, the systems, methods, and non-transitory computer readable media are further configured to provide the best scoring candidate value as a recommendation for populating the field in the page.

In an embodiment, evaluating the set of candidate values for accuracy based at least in part on the machine learning model further causes the systems, methods, and non-transitory computer readable media to determine a feature vector representing a candidate value, provide the feature vector to the machine learning model as an input, and obtain a score for the candidate value from the machine learning model, wherein the score measures an accuracy of the candidate value for the field in the page.

In an embodiment, the feature vector includes a feature representing a set of weighted user endorsements for the candidate value, wherein a user endorsement is weighted based on a credibility score associated with the user, the credibility score measuring a credibility of the user.

In an embodiment, wherein the feature representing the set of weighted user endorsements for the candidate value is determined based at least in part on an activation function or a logit function.

In an embodiment, wherein the feature vector includes a feature representing a set of weighted data pipeline endorsements for the candidate value, wherein a data pipeline endorsement is weighted based on a consensus score associated with the data pipeline, the consensus score measuring a rate at which the data pipeline satisfies a user consensus.

In an embodiment, the feature representing the set of weighted data pipeline endorsements is determined based at least in part on an activation function or a logit function.

In an embodiment, the systems, methods, and non-transitory computer readable media are further configured to cause one or more users to be polled to confirm or improve an accuracy of the best scoring candidate value.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
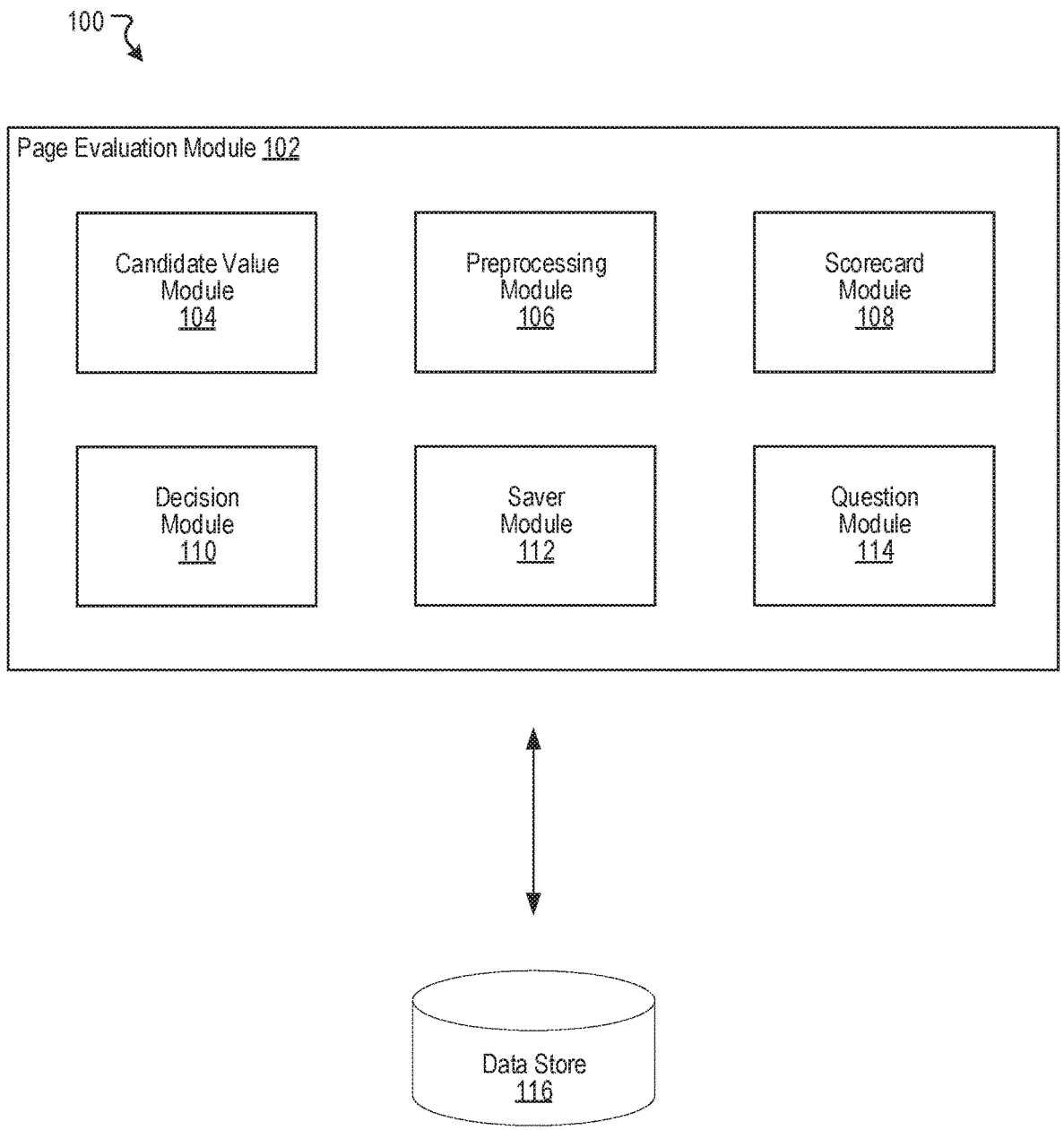
FIG. 1 illustrates an example system including an example page evaluation module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Evaluating Page Content

Under conventional approaches, users can access various content through a content provider (e.g., a social networking system). Typically, a user operating a computing device can interact with the content provider over one or more computer networks. Further, the accessed content can be presented through a display screen by a software application (e.g., a web browser, social networking application, etc.) running on the computing device. Such conventional approaches permit users to conveniently access various types of content. For example, an entity (e.g., page administrator, owner, etc.) may create and publish a page for a business through the content provider. Users can access the page to view various information related to the business such as a phone number, hours of operation, and address, to name some examples. In some instances, the values published for such fields in the page can be incorrect. Conventional approaches for addressing such inaccuracies are not equipped to scale as the number of content items being published continues to increase exponentially. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, an active self-learning platform can be configured to automatically populate or update values for fields in pages (e.g., a page category field, website field, phone number field, hours of operation field, physical address field, etc.). For example, the active self-learning platform can evaluate a number of potential (or candidate) values for a field in a page. These candidate values may be provided by user responses to a poll or by data pipelines (e.g., databases) that store various data (e.g., location data). The active self-learning platform can score each of the candidate values for the field based on one or more machine learning models. A score for a candidate value can represent a likelihood of the candidate value being accurate for the field in the page, for example. Further, in some embodiments, the active self-learning platform can automatically update the field in the page with the best scoring candidate value. For example, a physical address field in a page for a business can be updated to include a candidate physical address having the best score. In other embodiments, the active self-learning platform can provide the best scoring candidate value as a recommendation to an administrator of the page. This improved approach offers numerous advantages over conventional approaches. For example, the active self-learning platform can automatically determine correct values for various fields in a page. As a result, the active self-learning platform can populate empty fields in a page and can also update incorrect values for fields in a page. The active self-learning system thus helps ensure that various information included in pages is both accurate and complete, which improves the overall user experience. More details relating to the present technology are provided below.

FIG. 1 illustrates an example system 100 including an example page evaluation module 102, according to an embodiment of the present technology. In various embodiments, the page evaluation module 102 can be configured to evaluate candidate values for various fields in pages. For example, the page evaluation module 102 can be implemented as an active self-learning platform that can determine the best (or best scoring) values for various fields in a given page. As shown in the example of FIG. 1, the page evaluation module 102 can include a candidate value module 104, a preprocessing module 106, a scorecard module 108, a decision module 110, a saver module 112, and a question module 114. In some instances, the example system 100 can include at least one data store 116. The components (e.g., modules, elements, etc.) shown in this figure and all figures herein are exemplary only, and other implementations may include additional, fewer, integrated, or different components. Some components may not be shown so as not to obscure relevant details.

In some embodiments, the page evaluation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page evaluation module 102 or at least a portion thereof can be implemented using one or more computing devices or systems that include one or more servers, such as network servers or cloud servers. In some instances, the page evaluation module 102 can, in part or in whole, be implemented within or configured to operate in conjunction with a social networking system (or service), such as the social networking system 630 of FIG. 6. In some instances, the page evaluation module 102 can be, in part or in whole, implemented within or configured to operate in conjunction or be integrated with a client computing device, such as the user device 610 of FIG. 6. For example, the page evaluation module 102 can be implemented as or within a dedicated application (e.g., app), a program, or an applet running on a user computing device or client computing system. The application incorporating or implementing instructions for performing some, or all, functionality of the page evaluation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The page evaluation module 102 can be configured to communicate and/or operate with the at least one data store 116, as shown in the example system 100. The at least one data store 116 can be configured to store and maintain various types of data used by the page evaluation module 102. In some embodiments, the data store 116 can store information describing users, entities, and various content associated with entities. In some implementations, the at least one data store 116 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 116 can store information associated with users, such as user identifiers, user information, profile information, user specified settings, content produced or posted by users, and various other types of user data.

The candidate value module 104 can be configured to obtain candidate values for a given field in a page. For example, a page for a restaurant may include a website field. In this example, the candidate value module 104 can obtain candidate values to be evaluated for the website field. In some embodiments, the candidate values are determined based on user responses to one or more crowdsourced polls. For example, the users may be polled to vote on or submit a correct website for the page. In some embodiments, the candidate values are determined based on one or more data pipelines (e.g., third-party databases, machine learned data, etc.). For example, a data pipeline can be provided by a computing system of a third-party data company. The data pipeline can provide data that has been collected by the third-party data company for various entities (e.g., locations, businesses, points of interest, etc.). In this example, the candidate value module 104 can request candidate values for the website field from the data pipeline. For example, the candidate value module 104 can provide the data pipeline with information describing an entity associated with the page and the website field for which candidate values are being requested. In return, the data pipeline can provide one or more candidate values for the website field.

The preprocessing module 106 can be configured to preprocess candidate values obtained from users and data pipelines. In some embodiments, the preprocessing module 106 can normalize candidate values based on pre-defined rules to ensure consistency between the candidate values. For example, a first user may propose a candidate value of "example.com" for a website field in a page while a second user may propose a candidate value of "www.example.com". In this example, the candidate values can be normalized to "www.example.com" to ensure consistency between the candidate values. In another example, a user may propose a candidate value of "(123) 234-5678" for a phone number field while a data pipeline may provide a candidate value of "1232345678". In this example, the candidate values can be normalized to "123-234-5678" to ensure consistency between the candidate values. Such consistency can facilitate grouping of candidate values. In the foregoing example, the candidate values provided by the user and the data pipeline can be grouped and represented as a single candidate value "123-234-5678". This candidate value can also be associated with identifying the user and the data pipeline which provided responses endorsing the candidate value.

The scorecard module 108 can be configured to generate scorecards for candidate values. For example, a first set of votes (or responses) from users and data pipelines may indicate that a candidate value of "10 am to 7 pm" is the correct value for business hours field in a restaurant page. A second set of users and data pipelines may indicate that a candidate value of "9 am to 7 pm" is the correct value for the business hours field. In this example, the scorecard module 108 can generate a first scorecard for the candidate value "10 am to 7 pm" and a second scorecard for the candidate value "9 am to 7 pm". A scorecard for a candidate value can provide various information including, for example, information describing users and data pipelines that endorsed (or voted for) the candidate value. The scorecard for the candidate value can also indicate respective counts of users and data pipelines that endorsed the candidate value. In some embodiments, the scorecard can include information identifying users that agree with the candidate value and corresponding user features, such as user demographic data. Such information can be used to determine a veracity of the candidate value, as described below.

The decision module 110 can be configured to evaluate candidate values for page fields. For example, the decision module 110 can apply various approaches to determine whether a candidate value for a page field is accurate. In various embodiments, candidate values can be evaluated based on information included in their respective scorecards. In some embodiments, the decision module 110 can apply one or more machine learning models to evaluate candidate values. More details regarding the decision module 110 will be provided below with reference to FIG. 2.

The saver module 112 can be configured to determine whether to save candidate values for a given page field. For example, the saver module 112 can determine whether to save a candidate value based on an evaluation of the candidate value by the decision module 110. In various embodiments, the saver module 112 can apply various pre-defined rules to determine whether to save a given candidate value. For example, a phone number field in a page may be associated with a first scorecard with a candidate value of "123-234-5678" and a second scorecard with a candidate value of "555-555-5555". The first scorecard can be associated with respective score that represents a likelihood of the candidate value "123-234-5678" being correct for the field in the page. Similarly, the second scorecard can be associated with respective score that represents a likelihood of the candidate value "555-555-5555" being correct for the field in the page. In this example, the saver module 112 can save the best scoring scorecard in association with the page field. In some embodiments, when saving a candidate value for a page field, the saver module 112 updates the page field to include the candidate value. The page including the updated page field can be accessed by users through the social networking system. Many variations are possible.

The question module 114 can be configured to poll additional users to confirm the accuracy of candidate values. For example, in some embodiments, the question module 114 can poll users to confirm the accuracy of a candidate value that has a low or uncertain likelihood of being correct for a page. In such embodiments, user responses (or votes) to the polls can be assessed to further refine the likelihood of the candidate value being correct for the page. The candidate value can then be evaluated by the page evaluation module 102 based on the refined likelihood. Many variations are possible.

Figure 2:
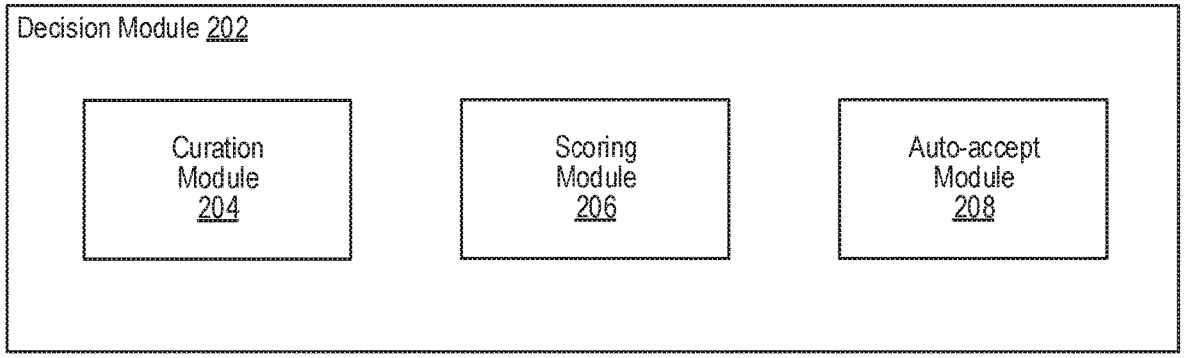
FIG. 2 illustrates an example decision module, according to an embodiment of the present technology.

FIG. 2 illustrates a decision module 202, according to an embodiment of the present technology. The decision module 202 can evaluate candidate values of fields in pages for accuracy. In some embodiments, the decision module 110 of FIG. 1 can be implemented with the decision module 202. As shown in the example of FIG. 2, the decision module 202 can include a curation module 204, a scoring module 206, and an auto-accept module 208.

The curation module 204 can be configured to accept a candidate value as being accurate based on a user that endorsed the candidate value. For example, a scorecard may propose a candidate value of "123-234-5678" for a phone number field in a page. In this example, the curation module 204 can determine the identity of a user that endorsed the candidate value. If the user is an authorized user (e.g., a page administrator), then the curation module 204 can automatically accept the candidate value as being accurate for the page. Many variations are possible.

The scoring module 206 can be configured to output respective scores for candidate values corresponding to some field in a page. For example, the scoring module 206 can apply a machine learning model to determine a score corresponding to a candidate value for a field in a page. For example, the scoring module 206 can access a scorecard corresponding to the candidate value. The scorecard can provide various information for the candidate value including, for example, information describing users and data pipelines that endorsed (or voted for) the candidate value. The scoring module 206 can determine a score for the candidate value based on such information. In various embodiments, the score can represent a likelihood of the candidate value being correct for the page. More details regarding the scoring module 206 will be provided below with reference to FIG. 3.

The auto-accept module 208 can be configured to accept a candidate value as being accurate based on a data pipeline that supported the candidate value. For example, a scorecard may propose a candidate value of "123-234-5678" for a phone number field in a page. In this example, the auto-accept module 208 can determine a data pipeline that supports the value and a corresponding consensus score associated with the data pipeline. If the consensus score satisfies a threshold value, then the auto-accept module 208 can automatically accept the candidate value as being accurate. Many variations are possible.

Figure 3:
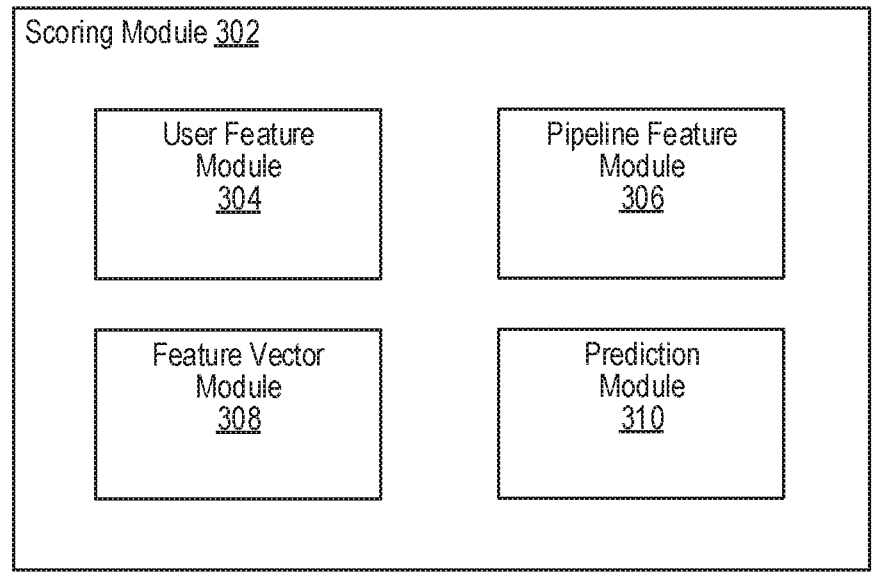
FIG. 3 illustrates an example scoring module, according to an embodiment of the present technology.

FIG. 3 illustrates a scoring module 302, according to an embodiment of the present technology. In some embodiments, the scoring module 206 of FIG. 2 can be implemented with the scoring module 302. As shown in the example of FIG. 3, the scoring module 302 can include a user feature module 304, a pipeline feature module 306, a feature vector module 308, and a prediction module 310.

The scoring module 302 can determine respective scores for candidate values for various fields in pages. As mentioned, each of the candidate values being evaluated can be associated with a respective scorecard. A scorecard for a candidate value can provide various information for the candidate value including, for example, information describing users and data pipelines that endorsed (or voted for) the candidate value, as described above.

The user feature module 304 can condense a plurality of user endorsements (or votes) for a candidate value for a page field into a single feature that can be used to score the candidate value. For example, in various embodiments, the user feature module 304 can apply a weight to each user endorsement for the candidate value based on a corresponding credibility score associated with the user. For example, a credibility score for a user can measure a likelihood of that user's endorsement being correct. In some embodiments, a credibility score for a user can be determined based on the user's historical tendency to endorse (or vote for) for candidate values that were ultimately deemed to be accurate. The user feature module 304 can then compress the plurality of user endorsements into a feature. For example, in some embodiments, the user feature module 304 can apply an activation function that aggregates the weighted user endorsements. In another embodiment, the user feature module 304 can apply a logit function that identifies the most accurate user endorsements. Many variations are possible.

The pipeline feature module 306 can condense a plurality of data pipeline endorsements (or votes) for a candidate value for a page field into a single feature that can be used to score the candidate value. For example, in various embodiments, the pipeline feature module 306 can apply a weight to each data pipeline endorsement based on a corresponding consensus score associated with the data pipeline. For example, a consensus score for a data pipeline can measure a likelihood of that data pipeline's endorsements being correct. In some embodiments, a consensus score for a data pipeline can be determined based on the data pipeline's historical tendency to endorse (or vote for) for candidate values that agree with a user consensus. For example, the consensus score can be determined based on the data pipeline's historical tendency to provide candidate values that agree with a threshold amount (e.g., number, percentage) of users that also provided responses (or votes) for those candidate values. The pipeline feature module 306 can then compress the plurality of data pipeline endorsements into a feature. For example, in some embodiments, the pipeline feature module 306 can apply an activation function that aggregates the weighted data pipeline endorsements. In another embodiment, the pipeline feature module 306 can apply a logit function that identifies the most accurate data pipeline endorsements. Many variations are possible.

The feature vector module 308 can be configured to generate corresponding feature vectors for candidate values. These feature vectors can be provided as inputs to a machine learning model to output respective scores for the candidate values. For example, a feature vector for a candidate value can include at least a first feature that was determined based on condensed user endorsements for the candidate value, as described above in reference to the user feature module 304. The feature vector for the candidate value can also include a second feature that was determined based on condensed data pipeline endorsements for the candidate value, as described above in reference to the pipeline feature module 306. The feature vector for the candidate value can include other features that can be used to determine a score for the candidate value. For example, in various embodiments, the feature vector can include features indicating an age of a page for which the candidate value is being evaluated, a count of users that have selected an option to identify themselves as fans of the page, and demographics of users that are fans of the page, to name some examples.

The prediction module 310 can determine scores for candidate values based on a machine learning model. The machine learning model can be trained to output respective scores for candidate values based on their feature vectors. For example, the machine learning model can be trained based on training data including, for example, user endorsements (or votes) for candidate values for a page field, data pipeline endorsements (or votes) for a candidate value for a page field, or a combination thereof, along with associated labels. When determining a score for a candidate value for a given page field, the prediction module 310 can obtain a feature vector corresponding to the candidate value, as determined by the feature vector module 308. The prediction module 310 can provide this feature vector as an input to the trained machine learning model. The trained machine learning model can output a score for the candidate value. The score can represent a likelihood of the candidate value being accurate for the page field.

Figure 4A:
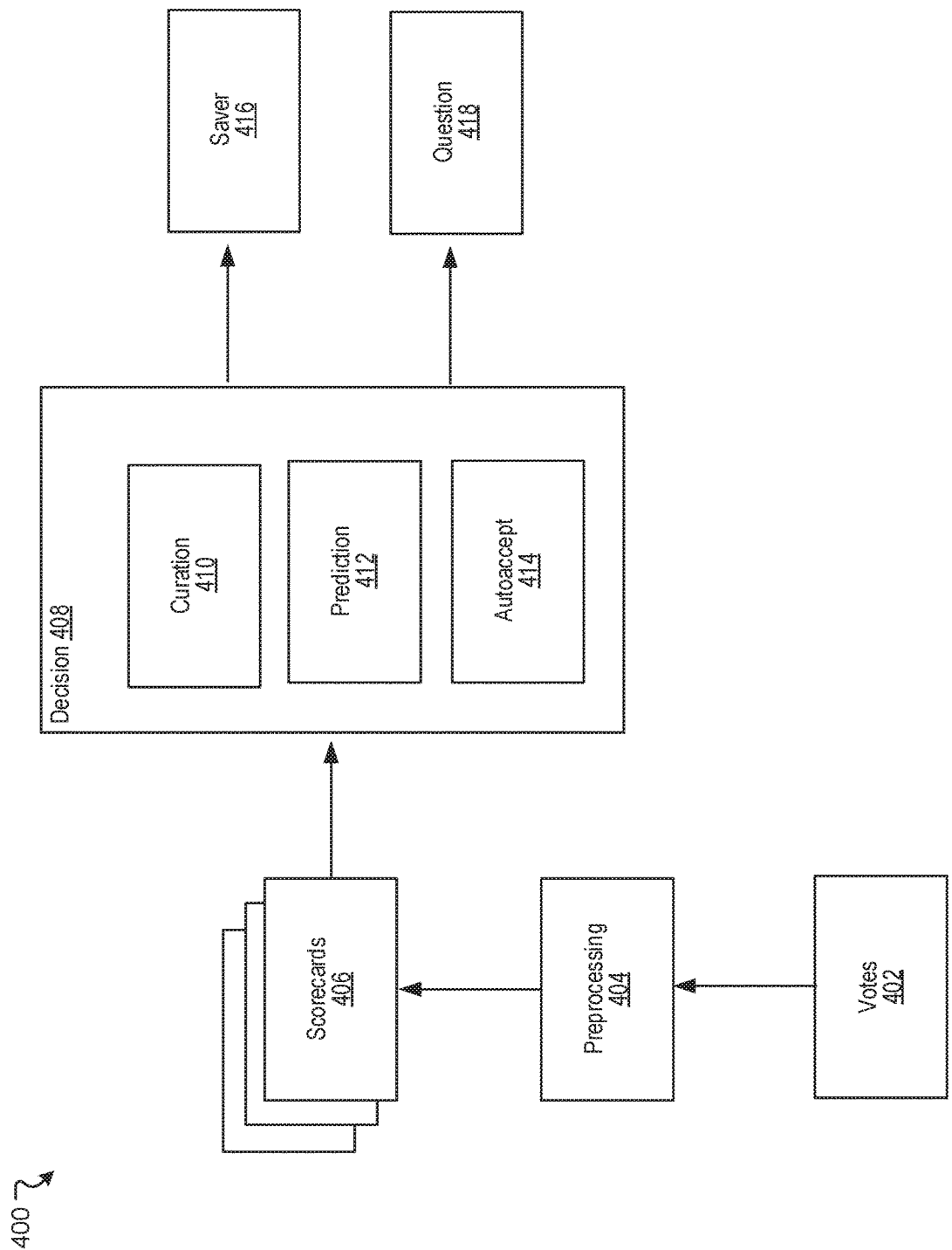
FIG. 4A illustrates an example functional block diagram, according to an embodiment of the present technology.

FIG. 4A illustrates an example functional block diagram 400, according to an embodiment of the present technology. The functional block diagram 400 describes operations that can be performed by an active self-learning platform. For example, at block 402, candidate values for a given field in a page can be obtained. For example, a page for a sporting goods store may include a website field. In this example, candidate values for the website field can be obtained based on user responses to one or more crowdsourced polls, responses from one or more data pipelines, or a combination thereof. At block 404, the candidate values are pre-processed for consistency, as described above. At block 406, respective scorecards for the candidate values can be generated, as described above. At block 408, various approaches can be applied to determine whether the candidate values should be accepted as being accurate. For example, at block 410, a candidate value that was submitted (or voted on) by an authorized user can automatically be deemed accurate. In another example, at block 412, a candidate value can be scored using a machine learning model. The candidate value can be deemed accurate if its score satisfies a threshold score. In yet another example, at block 414, a candidate value that was submitted by a data pipeline having a threshold consensus score can automatically be accepted as an accurate value. At block 416, various pre-defined rules can be applied to determine whether to save a given candidate value, as described above. At block 418, additional users can be polled to confirm accuracies of candidate values, as described above. Many variations are possible.

Figure 4B:
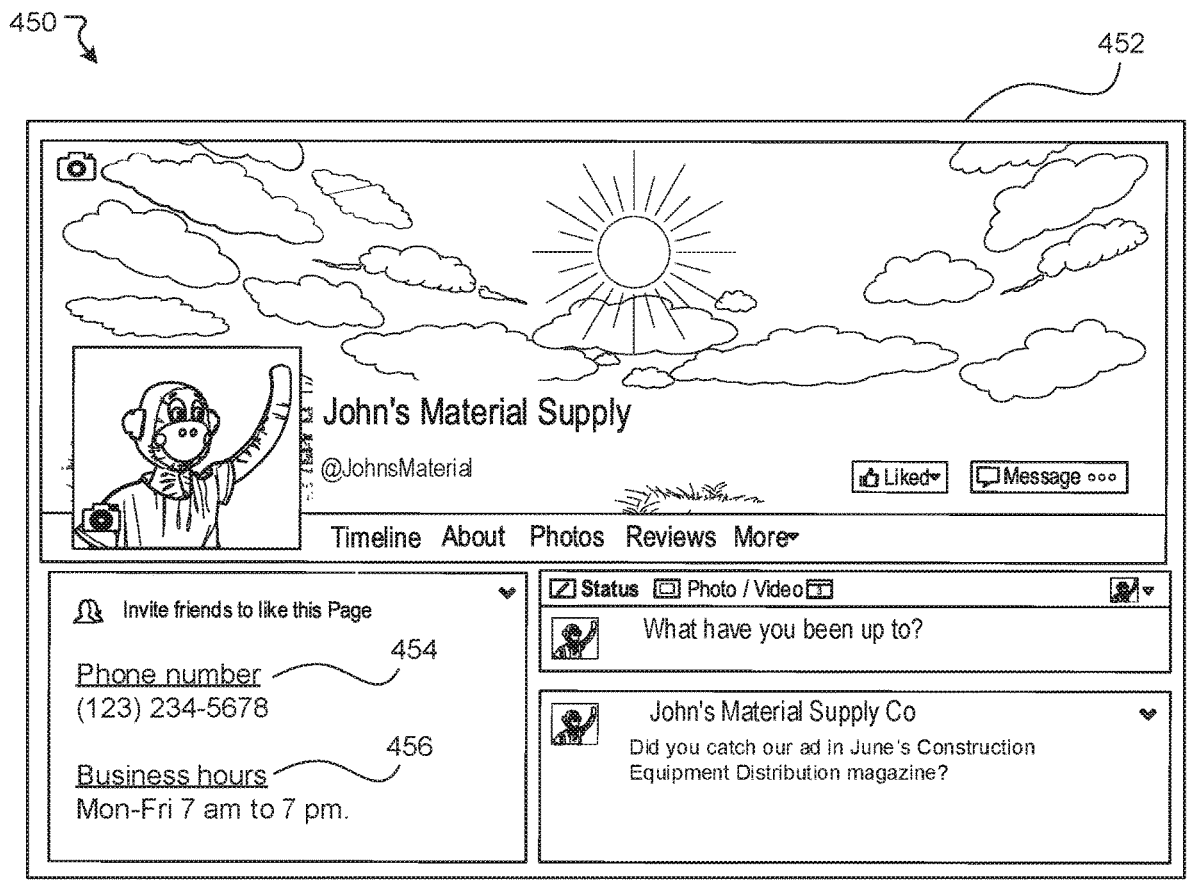
FIG. 4B illustrates an example page, according to an embodiment of the present technology.

FIG. 4B illustrates an example diagram 450 of a page 452, according to an embodiment of the present technology. The example page 452 may be presented on a display screen of a computing device. Further, the page 452 may be provided through an application (e.g., a social networking application) running on the computing device. The user operating the computing device can interact with the page 452 to access various information corresponding to a business ("John's Material Supply"). In some instances, such information can be provided in one or more fields in the page 452. For example, the fields may be pre-defined. In the example of FIG. 4B, the page 452 includes a first field 454 corresponding to a phone number and a second field 456 corresponding to business hours. In various embodiments, values provided in the page 452 for such fields can be evaluated using the approaches described herein. For example, the phone number provided in the first field 454 can be evaluated to determine its accuracy. In another example, the business hours provided in the second field 456 can be evaluated to determine their accuracy. Many variations are possible.

Figure 5:
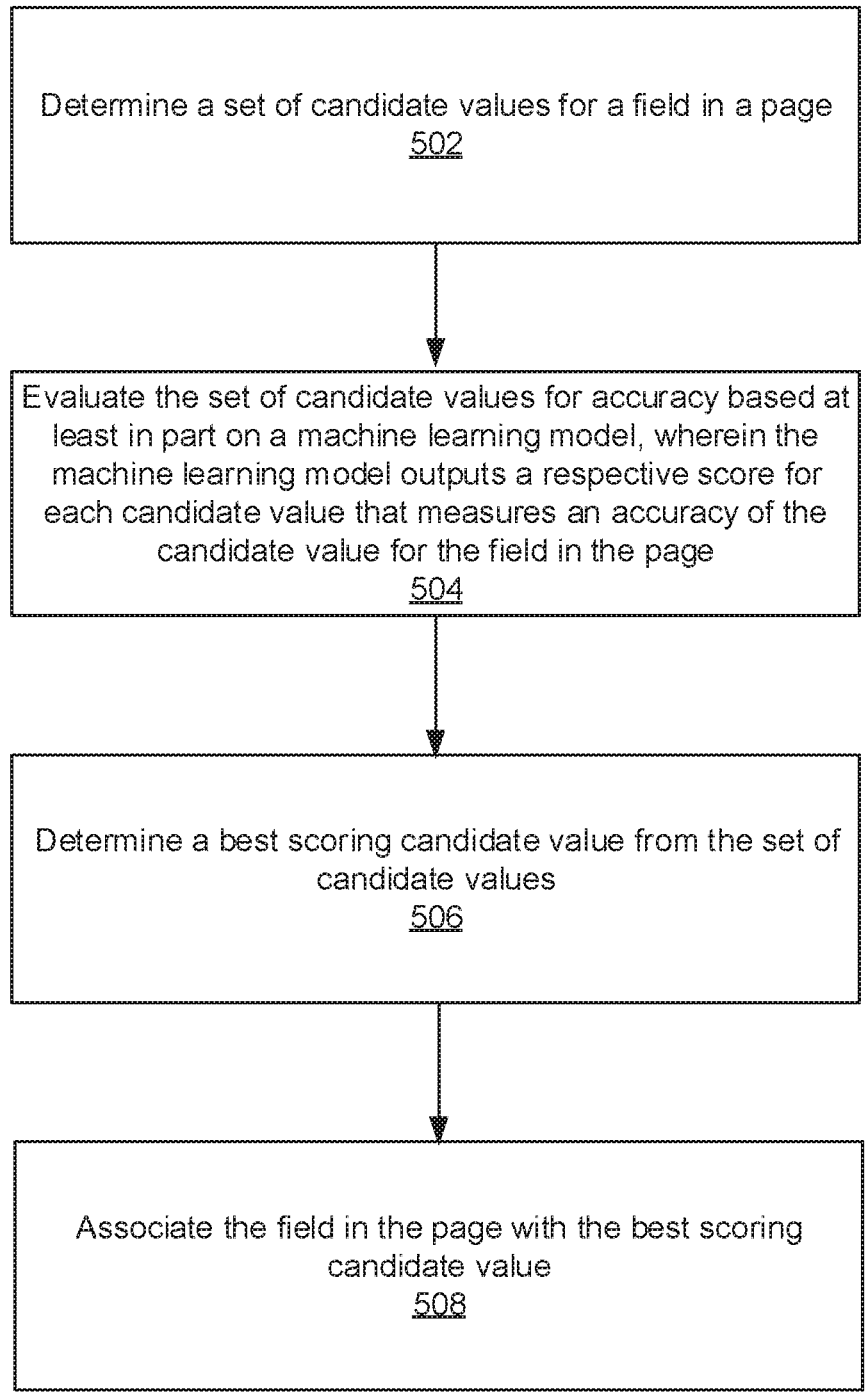
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, a set of candidate values can be determined for a field in a page. At block 504, the set of candidate values can be evaluated for accuracy based at least in part on a machine learning model. The machine learning model can output a respective score for each candidate value that measures an accuracy of the candidate value for the field in the page. At block 506, a best scoring candidate value can be determined from the set of candidate values. At block 508, the field in the page can be associated with the best scoring candidate value.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
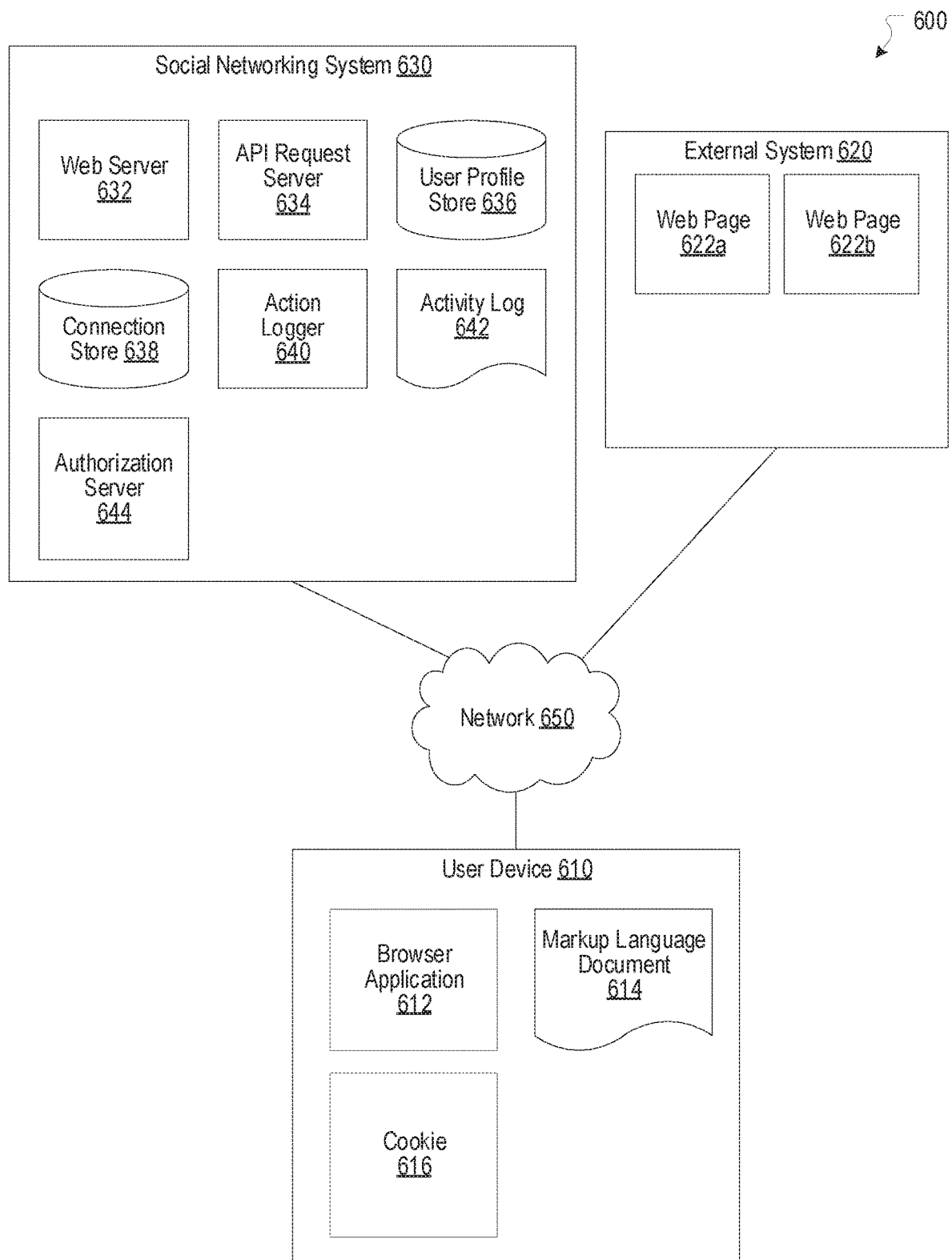
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page evaluation module. The page evaluation module, for example, can be implemented as some or all of the functionality of the page evaluation module 102 of FIG. 1. As discussed previously, it should be appreciated that there can be many variations or other possibilities.

Hardware Implementation

Figure 7:
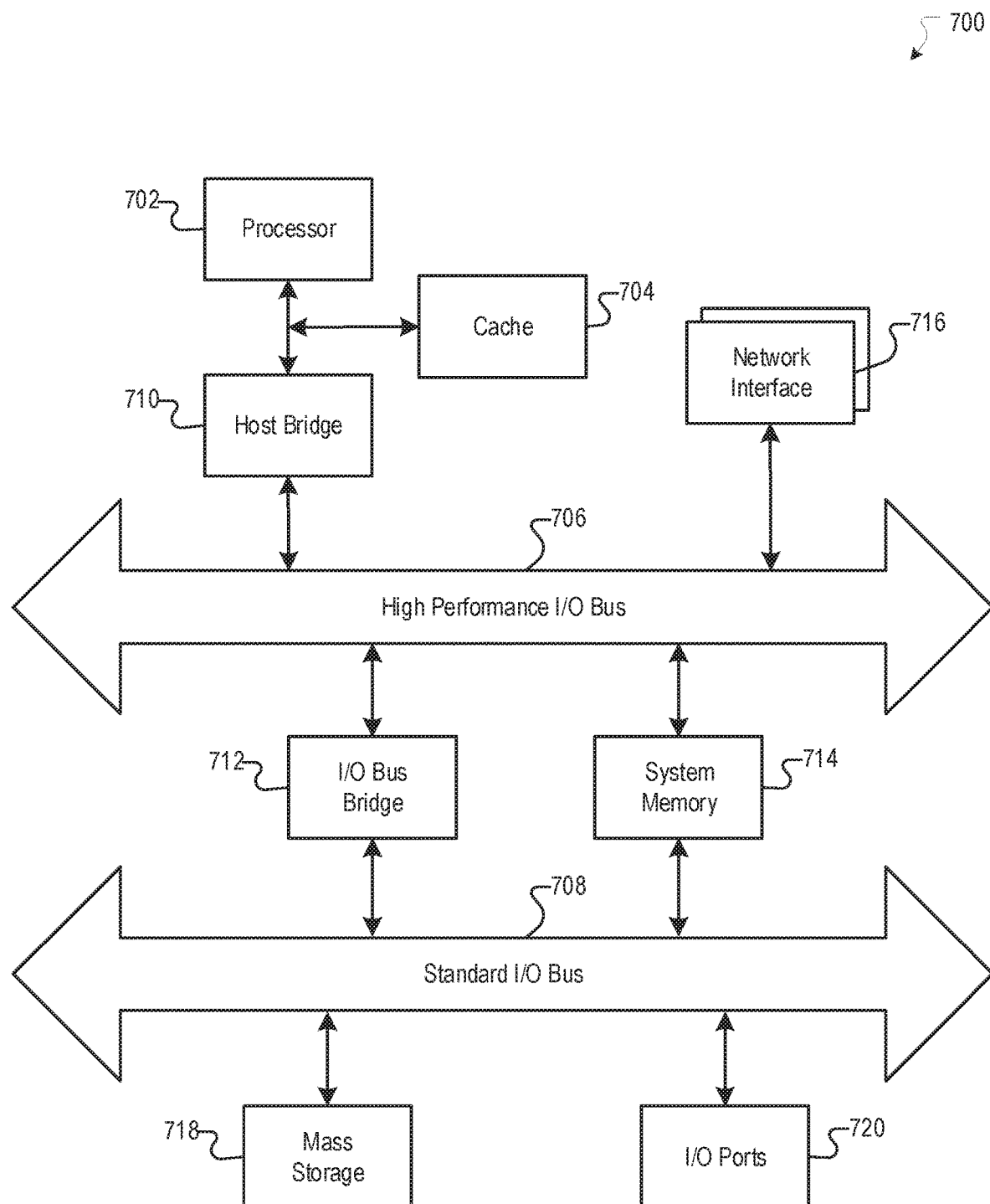
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a set of candidate values for a field in a page;
   evaluating, by the computing system, the set of candidate values for accuracy based at least in part on a machine learning model, wherein the evaluating further comprises:
   obtaining, by the computing system, a score for a candidate value from the machine learning model based on a feature vector that represents the candidate value, wherein the feature vector is associated with at least one feature that represents a data pipeline endorsement of the candidate value by at least one data pipeline, wherein the data pipeline endorsement is weighted based on a consensus score associated with the at least one data pipeline, wherein the consensus score measures a rate at which the at least one data pipeline has historically provided data pipeline endorsements for candidate values that were endorsed by a threshold amount of users;
   determining, by the computing system, a best scoring candidate value from the set of candidate values; and
   associating, by the computing system, the field in the page with the best scoring candidate value.

2. The computer-implemented method of claim 1, wherein the field corresponds to at least one of: a page category field, a website field, a phone number field, an hours of operation field, and a physical address field.

3. The computer-implemented method of claim 1, further comprising:
   causing, by the computing system, the field in the page to be populated with the best scoring candidate value.

4. The computer-implemented method of claim 1, further comprising:
   providing, by the computing system, the best scoring candidate value as a recommendation for populating the field in the page.

5. The computer-implemented method of claim 1, wherein the feature vector includes a feature representing a set of weighted user endorsements for the candidate value, wherein a user endorsement is weighted based on a credibility score associated with the user, the credibility score measuring a credibility of the user.

6. The computer-implemented method of claim 5, wherein the feature representing the set of weighted user endorsements for the candidate value is determined based at least in part on an activation function or a logit function.

7. The computer-implemented method of claim 1, wherein the feature vector includes a feature representing a set of weighted data pipeline endorsements for the candidate value, wherein the set of weighted data pipeline endorsements includes the at least one data pipeline endorsement.

8. The computer-implemented method of claim 7, wherein the feature representing the set of weighted data pipeline endorsements is determined based at least in part on an activation function or a logit function.

9. The computer-implemented method of claim 1, further comprising:
   causing, by the computing system, one or more users to be polled to confirm or improve an accuracy of the best scoring candidate value.

10. A system comprising:
    at least one processor; and
    a memory storing instructions that, when executed by the at least one processor, cause the system to perform:
    determining a set of candidate values for a field in a page;
    evaluating the set of candidate values for accuracy based at least in part on a machine learning model, wherein the evaluating further comprises:
    obtaining a score for a candidate value from the machine learning model based on a feature vector that represents the candidate value, wherein the feature vector is associated with at least one feature that represents a data pipeline endorsement of the candidate value by at least one data pipeline, wherein the data pipeline endorsement is weighted based on a consensus score associated with the at least one data pipeline, wherein the consensus score measures a rate at which the at least one data pipeline has historically provided data pipeline endorsements for candidate values that were endorsed by a threshold amount of users;

determining a best scoring candidate value from the set of candidate values; and associating the field in the page with the best scoring candidate value.

11. The system of claim 10, wherein the field corresponds to at least one of: a page category field, a website field, a phone number field, an hours of operation field, and a physical address field.

12. The system of claim 10, wherein the instructions further cause the system to perform:

causing the field in the page to be populated with the best scoring candidate value.

13. The system of claim 10, wherein the instructions further cause the system to perform:

providing the best scoring candidate value as a recommendation for populating the field in the page.

14. A non-transitory computer-readable storage medium including instructions that, when executed by at least one processor of a computing system, cause the computing system to perform a method comprising:

determining a set of candidate values for a field in a page;

evaluating the set of candidate values for accuracy based at least in part on a machine learning model, wherein the evaluating further comprises:

obtaining a score for a candidate value from the machine learning model based on a feature vector that represents the candidate value, wherein the feature vector is associated with at least one feature that represents a data pipeline endorsement of the candidate value by at least one data pipeline, wherein the data pipeline endorsement is weighted based on a consensus score associated with the at least one data pipeline, wherein the consensus score measures a rate at which the at least one data pipeline has historically provided data pipeline endorsements for candidate values that were endorsed by a threshold amount of users;

determining a best scoring candidate value from the set of candidate values; and associating the field in the page with the best scoring candidate value.

15. The non-transitory computer-readable storage medium of claim 14, wherein the field corresponds to at least one of: a page category field, a website field, a phone number field, an hours of operation field, and a physical address field.

16. The non-transitory computer-readable storage medium of claim 14, wherein the instructions further cause the computing system to perform:

causing the field in the page to be populated with the best scoring candidate value.

17. The non-transitory computer-readable storage medium of claim 14, wherein the instructions further cause the computing system to perform:

providing the best scoring candidate value as a recommendation for populating the field in the page.

\* \* \* \* \*